H. HEIDE.
ARMOR.
APPLICATION FILED NOV. 20, 1917.
1,257,484.
Patented Feb. 26, 1918
2 SHEETS—SHEET 2.
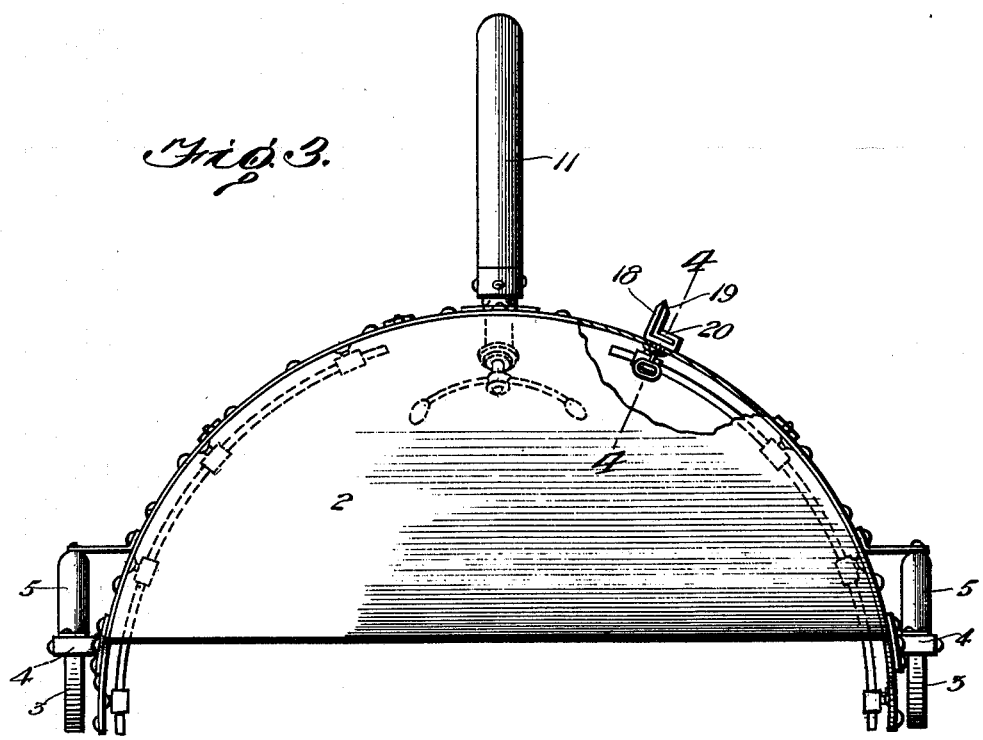
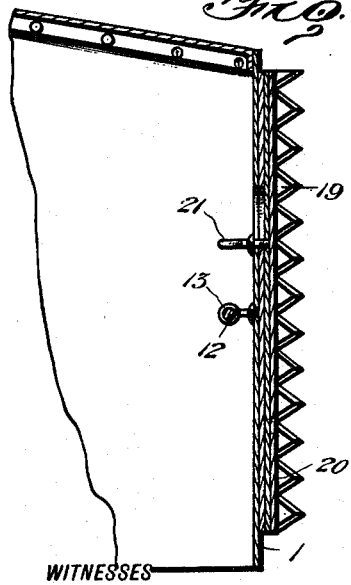
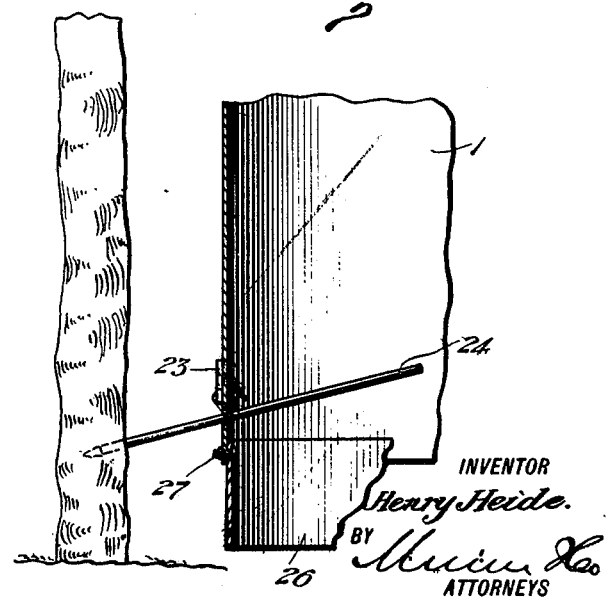
WITNESSES
INVENTOR
Henry Heide.
BY
ATTORNEYS

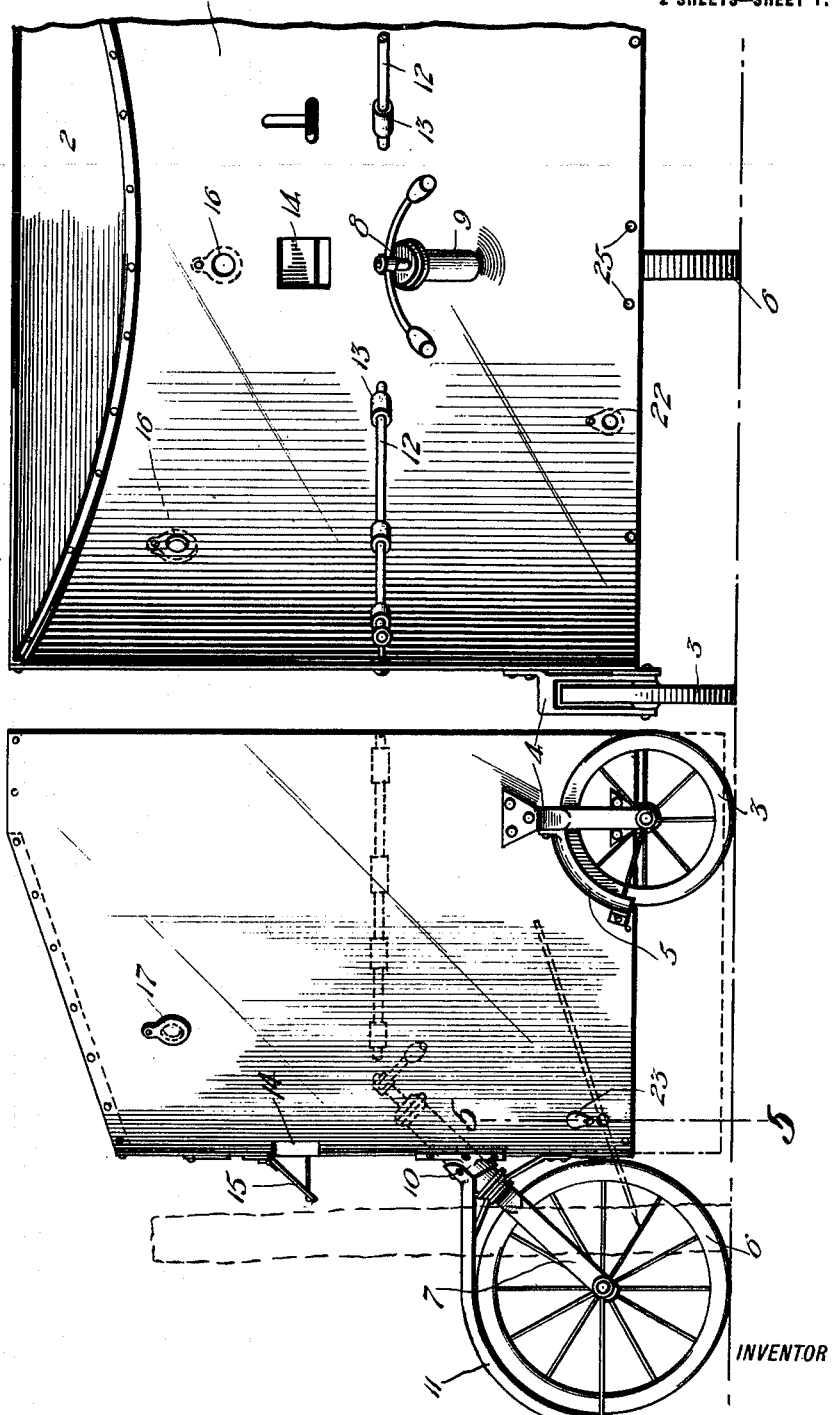

UNITED STATES PATENT OFFICE.

HENRY HEIDE, OF WINSLOW, ARIZONA.

ARMOR.

1,257,484. Specification of Letters Patent. Patented Feb. 26, 1918.

Application filed November 20, 1917. Serial No. 202,972.

*To all whom it may concern:*

Be it known that I, HENRY HEIDE, a citizen of the United States, and a resident of Winslow, in the county of Navajo and State of Arizona, have invented certain new and useful Improvements in Armor, of which the following is a specification.

My invention is an improvement in armor, and has for its object to provide armor for infantry, capable of shielding several men when advancing to destroy barbed wire fences or the like, wherein an arc shaped plate is provided having an inclined top and supported by wheels, one of which is capable of being turned to guide the plate, the said plate having machine gun openings and shielded sight openings, and having a saw capable of being operated from the inside for cutting wire.

In the drawings:

Figure 1 is a side view of the armor;

Fig. 2 is a rear view;

Fig. 3 is a top plan view, with parts broken away;

Fig. 4 is a section on the line 4—4 of Fig. 3;

Fig. 5 is a section on the line 5—5 of Fig. 1.

In the present embodiment of the invention, the armor comprises a transversely curved plate 1 of suitable metal, having a top 2 which is inclined at its forward edge, as shown, and the top has an inwardly extending flange which is riveted to the plate 1. Side wheels 3 are arranged at the ends of the plate 1, each wheel being journaled between the arms of a substantially U-shaped yoke 4 which is secured to the plate, and each wheel 3 has a guard 5 at the forward upper part thereof, the guard being connected to the plate 1 and to the outer arm of the yoke.

A steering wheel 6 is provided, the said wheel being journaled between the arms 7 of a fork, the fork having a steering post 8 held in a steering column 9, which extends through an opening at the center of the plate 1, and is held in a bearing 10 on the plate. Steering handles are connected with the post, in convenient position for the occupant who walks within the armor. A guard 11 is provided for the wheel 6, the said guard covering the forward upper part of the wheel.

Hand rails 12 are arranged within the armor, the said rails being curved to correspond with the curve of the armor and being held by sleeves 13 connected with the plate, and the said rails are arranged on opposite sides of the steering column.

The sight opening 14 is arranged in the plate 1 directly above the steering post, and this opening is shielded by an inclined shield 15 outside the plate. This shield is arranged at an angle of approximately forty-five degrees, and the lower edge is spaced somewhat above the lower edge of the opening 14 so that a maximum protection is obtained, while at the same time permitting the occupant to see the road in front and to see straight ahead for some distance. It will be obvious that several persons may find shelter within the armor, one of the occupants steering the armor, while the others hold to the hand rails 12 and assist in propelling the armor.

Openings 16 are provided above the rails, and above the sight opening 14 for permitting the passage of the barrels of machine guns, and each of these openings is normally closed by a pivot or cover plate 17. These plates are pivoted above the openings so that they will drop into closed position by gravity.

A saw is arranged at one side of the sight opening 14, the said saw comprising a fixed blade 18 and a movable blade 19, both blades having cutting teeth, as shown in Fig. 4. Both blades have angular portions, the angular portion of the fixed blade being secured to the armor plate while the angular portion of the movable blade fits upon the angular portion of the fixed blade, and the angular portion of the fixed blade has a flange 20 overlying the angular portion of the movable blade to hold and guide the same.

A handle 21 is secured to the movable blade, and extends through registering slots in the plate 1 and in the angular portion of the fixed blade, and by means of the handle the movable blade may be moved vertically on the fixed blade to saw through barbed wire. An opening 22 is provided near the bottom of the plate 1 and at one side thereof, and the said opening is normally closed by a pivoted cover plate 23. This cover plate is arranged like the cover plates 17 to normally close by gravity, and the opening is for the purpose of permitting the passage of a pointed rod or bar 24, by means of which barbed wire posts may be lifted from the ground, as shown in Fig. 5.

In order to dislodge a post, the pointed bar is pushed through the opening 22, the point is engaged with the post and, bearing down on the inner end, the post may be lifted from the ground.

It will be noticed from an inspection of Figs. 1 and 2 that the lower edge of the plate 1 is spaced above the ground some distance, this being necessary to permit the free movement of the armor over rough surfaces. It is advisable, however, to provide some protection for the feet of the occupants, and for this purpose openings 25 are provided at the lower edge of the plate 1. These openings are for the purpose of engagement by connecting means, to suspend a curtain from the lower edge of the plate 1. This curtain may be of cloth, colored to correspond with that of the armor, when the surface to be traversed is unequal and filled with obstructions, but where the surface is level and uniform, the curtain 26 shown in Fig. 5 may be used, the said curtain being of metal and being secured to the bottom of the plate 1 by bolts and nuts 27.

In use, the armor with its occupants is pushed forward, with the curtain extending from the bottom of the plate 1, the nature of the curtain depending upon the ground to be traversed. When a barbed wire entanglement is reached, the wires are cut with the saw and the posts are pulled with the bar. Machine guns can be carried and used, and hand grenades, revolvers and the like may also be carried.

In practice, the sides, with the plate 1, will be of three-sixteenths inch steel armor plate, the top or roof being of one-eighth inch. With three men, one will operate the steering wheel and the other two, grasping the hand rails, will propel the armor. In snow, sled runners may be used instead of wheels, and in shallow water pontoons.

The rails 12 will be preferably of wood in order to prevent shock should the device strike an electric wire. When laid upon the ground with the convex face up, the plate may be used as a breastworks, and by placing planks transversely of a trench the plate may serve as a cover to protect the inmates from shrapnel. In case of attack from the rear, each plate 1 being a semi-circle, two of the armors may be placed back to back, forming a circular fortress for protection in all directions.

It will be noted that the hood of the cover comprises only the inclined portion. The accessories, the saw and the bar are removable, and the armor can be used without such accessories if desired. The armor might be built in two sections, connected at the center by flanges and bolts, if desired.

I claim:

1. A device of the character specified, comprising a sheet of armor plate curved to form a concavo-convex shield, wheels at the end of the plate for supporting the same, a steering wheel at the center of the plate and having steering mechanism extending through the plate, a hood or cover for the plate, said hood or cover inclining downwardly toward the front of the plate, said plate having hand rails at each side of the steering wheel and loop holes above the hand rails and above the steering wheel, covers for the loop holes pivoted to the plate, and a cutter arranged in vertical position at one side of the front of the plate and on the outer face and having operating mechanism on the inner face.

2. A device of the character specified, comprising a sheet of armor plate curved to form a concavo-convex shield, wheels at the end of the plate for supporting the same, a steering wheel at the center of the plate and having steering mechanism extending through the plate, a hood or cover for the plate, said hood or cover inclining downwardly toward the front of the plate, said plate having hand rails at each side of the steering wheel and loop holes above the hand rails and above the steering wheel, and covers for the loop holes pivoted to the plate.

3. A device of the character specified, comprising a sheet of armor plate curved to form a concavo-convex shield, wheels at the end of the plate for supporting the same, a steering wheel at the center of the plate and having steering mechanism extending through the plate, a hood or cover for the plate, said hood or cover inclining downwardly toward the front of the plate, a cutting device at one side of the front of the plate, said device comprising a toothed bar secured to the plate, a second bar having teeth and mounted to slide on the first named bar, the teeth of the bars coöperating, and a handle for the last named bar extending through the said plate, said plate having a slot for the handle.

4. A device of the character specified, comprising a sheet of armor plate curved to form a concavo-convex shield, wheels at the end of the plate for supporting the same, a steering wheel at the center of the plate and having steering mechanism extending through the plate, a hood or cover for the plate, said hood or cover inclining downwardly toward the front of the plate, a sight opening above the steering means, and a hood for protecting the opening.

5. A device of the character specified, comprising a sheet of armor plate curved to form a concavo-convex shield, wheels at the end of the plate for supporting the same, a steering wheel at the center of the plate and having steering mechanism extending through the plate, a hood or cover for the plate, a sight opening above the steering means and a hood for protecting the opening.

HENRY HEIDE.

Witnesses:
 CHAS. L. FLINN,
 D. FORBES.